United States Patent Office
3,478,004
Patented Nov. 11, 1969

3,478,004
CROSSLINKING POLYOLEFINS WITH SELECTED DIOXIME DIESTERS
Clifton L. Kehr, Silver Spring, and James L. Guthrie, Ashton, Md., assignors to W. R. Grace & Co., New York, N.Y., a corporation of Connecticut
No Drawing. Continuation-in-part of application Ser. No. 553,300, May 27, 1966. This application Apr. 26, 1967, Ser. No. 634,009
Int. Cl. C08f 27/08
U.S. Cl. 260—80.78
18 Claims

ABSTRACT OF THE DISCLOSURE

The method of crosslinking polymers derived from α-olefins which comprises admixing said polymers with a curing agent consisting of non-quinonoid diesters of dioximes.

This application is a continuation-in-part of our copending application having Ser. No. 553,300, filed May 27, 1966 now abandoned.

In the field of polymers derived from α-olefins, there is a continuing search for new and better crosslinking agents. One class of operable crosslinking agents are esters, both mono and di, of quinone dioxime as set out in a copending application having Ser. No. 168,025, filed Jan. 18, 1962, now U.S. Pat. No. 3,305,517; and assigned to the same assignee. Although these esters of quinone dioxime have excellent stability they have the drawback that on curing they turn the polymer black thereby precluding its use in many present day applications.

Therefore, one object of this invention is to provide a novel crosslinking system which effects curing of polymers derived from α-olefins and copolymers containing same which causes at worst only slight discoloration (i.e. light tan color) of the polymer on curing. In these systems, pigmentation is possible in order to obtain vulcanizates in a wide range of different colors.

Still another object of the present invention is to provide a class of accelerators which when combined with the crosslinking agents of this invention lower the curing temperature of the polymer.

Other objects and advantages of this invention will become apparent from a reading hereinafter.

Summarily this invention relates to curing polymers or blends of polymers derived from α-olefins which comprises admixing said polymers with a curing agent consisting of diesters of dioximes wherein the oxime nitrogen atoms are connected by a chain of conjugated unsaturated carbon atoms of the formula:

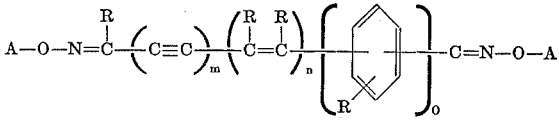

wherein A is acyl, aroyl, alkyl sulfonyl, aryl sulfonyl, alkyl phosphinyl, aryl phosphinyl, alkyl sulfinyl, aryl sulfinyl, alkyl carbamyl and aryl carbamyl, said aryl and alkyl groups containing 1–36 carbon atoms, R is H, alkyl, aryl, alkaryl, aralkyl, halogen, nitro, and

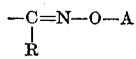

wherein R is as herein defined and $m$, $n$, and $o$ are integers from 0 to 2 and heating said admixture to effect curing.

Examples of operable crosslinking agents in the present invention include, but are expressly not limited to, 3-hexyne-2,5-dione dioxime diacetate; 3-hexene-3-methyl-2,5-dione dioxime dichlorobenzoate; 2-nitroterephthalaldehyde dioxime di-p-toluenesulfonic acid; dimethylglyoxime dimethanesulfonate; dimethylgoxime dibutanesulfinate; dimethylglyoxime dibenzenesulfinate; dimethylglyoxime diphenylphosphinate; dimethylglyoxime dibutylphosphinate, dimethylglyoxime dichlorophosphinate; dimethylglyoxime diphenylcarbamate; dimethylglyoxime diethyl carbamate; 3-octen-5-yne-2,7-dione dioxime distearate; 4-(1-buten-3-onyl) benzaldehyde dioxime dioctanoate; 4-(1-butyn-3-onyl) benzaldehyde dioxime diacetate; 4-(1-butyne-3-onyl) cinnamaldehyde dioxime dibutyrate; furil dioxime distearate; 1-phenyl-1,2-propanedione dioxime distearate; terephthalaldehyde dioxime distearate; glyoxime distearate; glyoxime dibenzoate; dimethyl-glyoxime distearate; dimethylglyoxime dibenzoate and diphenylglyoxime distearate.

The invention also encompasses the use of accelerators consisting of metal salts or metal chelates which increases the crosslinking efficiency and also allow for the use of a lower crosslinking temperature.

As used herein the term "α-olefin" means a hydrocarbon monomer which contains a single terminally unsaturated grouping of the formula

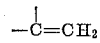

As used herein the term "polymers derived from α-olefins" includes co- and terpolymers wherein at least 50 mole percent of the polymer is derived from α-olefins as herein defined. Thus the polymers derived from α-olefins would include, but are expressly not limited to, polyethylene, polypropylene, ethylene/propylene copolymers, ethylene/butylene copolymers, butyl rubber, ethylene/propylene/diene terpolymers and/ethylene/vinyl acetate copolymers, said latter two containing at least 50 mole percent of the poly α-olefins. The polymers derived from α-olefins as meant herein would also include polymers derived from α-olefins which have been further processed such as having been chlorinated, chlorosulfonated, oxidized, etc., e.g. chlorosulfonated polyethylene described in U.S. 2,212,786.

In the present invention the accelerators include, but are not limited to $AlCl_3$, $FeCl_3$, $SnCl_4$, $ZnCl_2$, $TiCl_4$, $CrCl_3$, $VCl_4$, $AlBr_3$, $HgCl_2$, $BF_3$ and the like. Also included in the definition of accelerators herein are coordination compounds which prior to addition to the polymer compound have their maximum coordination number satisified, but which in the course of compounding and curing interact with the curing agent. Examples of this latter type of accelerator are coordination complexes, as illustrated by but not limited to, ferric acetylacetonate, aluminum acetylacetonate, zinc acetylacetonate, boron fluoride n-butyl etherate, and the like. The addition of said accelerators to the system causes optimum curing to occur at temperatures below the optimum curing temperature of the crosslinking agents per se as will be shown hereinafter and in addition increases the crosslinking efficiency.

The amount of crosslinking agent used in this invention is not critical and can vary over wide limits depending upon the polymer being crosslinked. Amounts of diesters of dioximes in the range 0.1–30 parts per 100 parts of polymer by weight, preferably 0.5–20 parts per 100 parts of polymer are employed.

The amount of accelerator used is in the range 0.005–2.0 parts by weight per 100 parts of polymer. The accelerator may, if desired, be added to the compound step as a solution (5–20% by weight) in suitable solvents for ease of handling and for uniformity of dispersion. Low boiling organic solvents such as acetone, isopropanol, ethanol, benzene and the like are operable.

The polymer compositions to be cured in accord with the present invention may, if desired, include such additives as antioxidants, fillers, pigments, antistatic-agents, extending oils, plasticizers, tackifiers and the like within the scope of this invention. Such additives are usually, but not necessarily, added to the polymer composition by preblending prior to or during the compound step. Operable fillers would include carbon black, clay, silica, alumina, carbonates, oxides, hydroxides, silicates, diatomaceous earth, talc, kaolin, barium sulfate, calcium sulfate, calcium carbonate and the like. The aforesaid additives may be present up to 200 parts or more per 100 parts of polymer by weight and preferably 0.05–100 parts on the same basis.

Although the invention is operable with polymers derived from $\alpha$-olefins and copolymers containing same, for ease of explanation and clarity the invention will, in the main, be explained using ethylene/propylene rubber (EPR) as the polymer to be cured.

The general procedure for converting the dioximes to the desired esters was by reaction with the appropriate acid chloride in pyridine. Typically, 10 g. of the oxime was dissolved in 150 ml. of pyridine in a 500 ml. Erlenmeyer flask, with some heating (up to 50° C.) if necessary. A 10% excess of the acid chloride was added at once while the flask was swirled. The esters usually precipitated almost immediately and the mixture became warm. The flask was stoppered and allowed to stand 1 hour. The product was poured into two liters of distilled water. It was then collected by filtration, washed free of pyridine with water and dried before use in the crosslinking reactions.

The general procedure followed in performing this invention is to form a compound of the desired ingredients in a Brabender plastograph, Banbury mixer, two-roll mill or the like at workable temperatures in the range 25–200° C. The compounding temperature is determined by, and is in excess of, the softening point of the polymer but is below the curing temperature exhibited by the crosslinking agent. When milling the polymer above its softening point (which for EPR usually would be in the range 25–120° C.), any filler or other additives are compounded in with continued milling. The crosslinking agent is then added, followed by the addition of the accelerator when desired. It is possible to add all the aforementioned components together to the softened polymer but for more uniform mixing and ease of handling, they are preferably added stepwise. The milling step is ordinarily carried on for 2 to 15 minutes. In actual practice to form a commercial article the resulting compound is then processed into its final shape by an extruding or molding step under pressure at temperatures above the softening point of the polymer but below the curing temperature exhibited by the crosslinking agent. This step is followed by heating the shaped article to a higher temperature range, e.g. for EPR a temperature in excess of 130° C. whereat rapid curing of the polymer is effected. In the examples herein the practice was to remove the compound from the milling step and cure the compound in the form of a 20 mil thick plaque at 40,000 p.s.i. on a platen press holding the compounds at the desired temperature above the decomposition temperature of the cross-linking agent for 5 minutes. For most of the testing herein the curing temperature employed was 225° C. However, it should be noted that the curing temperature can range from 100° C. up to 250° C. or more without varying from the intent of the instant invention. The curing temperature is dependent upon many factors, including (1) the polymer being cured, (2) the actual crosslinking agent and the amounts thereof, and (3) whether or not an accelerator is added to the system. As a general rule the curing temperature employed for optimum curing, i.e. where the state of cure (percent gel) plateaus out, is from 100 to 250° C.

The following examples are set down as an aid in understanding the invention but are expressly not designed to limit its scope. In the examples, unless otherwise noted all parts and percentages are by weight per 100 parts polymer.

Throughout the instant invention the melt indices (MI) were measured under the conditions specified in ASTMD 1258–52T and the densities of the polymers were measured under conditions as specified in ASTMD 1505–57T. The percent gel content of the polymers of the instant invention was measured by refluxing a weighed sample (approximately 0.5 g.) of polymer in a cellulose Soxhlet thimble in n-heptane (containing 0.3 weight percent, 2,6-ditertiary-butyl-4-methylphenol) commercially available under the trade name "Ionol" from Shell Oil Corp. for 24 hours. The insoluble portion of the polymer sample after drying was weighed to calculate percent gel as follows:

$$\text{Percent gel} = \frac{\text{weight insoluble sample}}{\text{total weight sample}} \times 100$$

In all examples, unless otherwise noted, a Brabender Plastograph Model PL–V2 equipped with a recording unit for measuring changes in torque was used for compounding.

EXAMPLE 1

To 150 ml. of pyridine in a 500 ml. Erlenmeyer flask was added 8.8 g. (0.1 mole) of glyoxime. As soon as all of the glyoxime had dissolved, 66.5 g. (0.22 mole, 10% excess) of stearoyl chloride was added at once while the flask was swirled by hand. The reaction mixture was allowed to stand at ambient temperature for one hour, then poured into one liter of distilled water. The crude glyoxime distearate was collected by filtration on a sintered glass funnel, and washed four times on the funnel with 500 ml. of distilled water to remove as much of the pyridine as possible. It was then dried overnight in a vacuum oven at 50° C. The dried glyoxime distearate, M.P. 105–110° C., weighed 54.5 g. (88% yield). Before use, part of this was recrystallized from benzene to obtain purified glyoxime distearate, M.P. 111–112° C.

EXAMPLE 2

The procedure of Example 1 was used, substituting 22.0 g. (0.1 mole) of furil dioxime for glyoxime. There was obtained 39.1 g. (52% yield) of crude furil dioxime distearate which melted at 90–93° C. after recrystallization from petroleum ether.

EXAMPLE 3

Into a one-liter round-bottomed flask were placed 250 ml. of ethyl alcohol, 250 ml. of pyridine, 33.5 g. (0.25 mole) of terephthalaldehyde, and 34.8 g. (0.5 mole) of hydroxylamine hydrochloride. The mixture was heated under reflux for two hours, then cooled to ambient temperature. The terephthalaldehyde dioxime which had been formed was removed by filtration and dried overnight in a vacuum oven at 50° C.

The procedure in Example 1 was then followed, using 16.4 g. (0.1 mole) of terephthalaldehyde, M.P. 217–220° C. There was obtained 28.5 g. (41% yield) of terephthalaldehyde distearate which melted at 145–146° C. after recrystallization from methyl alcohol.

The elemental analyses and melting ranges of various operable crosslinking agents of the instant invention are shown in Table I.

thus crosslinked polymer showed only slight discoloration and had a gel content of 13%.

TABLE I.—ELEMENTAL ANALYSES AND MELTING RANGES OF VARIOUS CROSSLINKING OXIME ESTERS

| Compound | Melting Range | Carbon | | Elemental Analyses Hydrogen | | Nitrogen | |
|---|---|---|---|---|---|---|---|
| | | Theory | Found | Theory | Found | Theory | Found |
| Furil dioxime distearate | 90-93 | 73.36 | 73.40 | 10.17 | 10.11 | 3.72 | 3.54 |
| 1-phenyl-1,2-propanedione dioxime distearate | 60-61 | 76.00 | 75.37 | 11.05 | 10.91 | 3.93 | 4.14 |
| Terephthalaldehyde dioxime distearate | 145-146 | 75.81 | 75.59 | 10.98 | 10.93 | 4.02 | 4.05 |
| Glyoxime distearate | 111-112 | 73.51 | 73.78 | 11.68 | 11.51 | 4.51 | 4.53 |
| Glyoxime dibenzoate | 217-218 | 64.86 | 64.93 | 4.08 | 4.08 | 9.45 | 9.34 |
| Dimethylglyoxime distearate | 82-83 | 74.02 | 74.94 | 11.80 | 11.62 | 4.32 | 4.25 |
| Dimethylglyoxime dibenzoate | 238-239 | 66.66 | 66.35 | 4.97 | 5.09 | 8.63 | 8.10 |
| Diphenylglyoxime distearate | 90-91 | 77.65 | 77.32 | 10.44 | 10.10 | 3.63 | 3.53 |
| Terephthalaldehyde dioxime dibenzoate | 236-238 | 70.97 | 69.64 | 4.33 | 4.16 | 7.52 | 7.49 |
| Glyoxime diacetate | 125-127 | 41.88 | 35.89 | 4.65 | 4.66 | 16.29 | 22.29 |

EXAMPLE 4

Crosslinking reactions 37.5 g. of ethylene-propylene rubber (EPR) were milled for 5 minutes in air at 110° C. at 30 r.p.m. in a Brabender plastograph. 0.012 mole of glyoxime distearate per 100 g. EPR was added and milling was continued for an additional 5 minutes. The compounded material was removed from the Brabender plastograph and pressed into a 20 mil thick plaque on a platen press at 40,000 p.s.i. at 225° C. for 5 minutes to effect curing. On characterization, the thus cured polymer showed only slight discoloration, i.e. light tan color, and had a gel content of 21%.

EXAMPLE 5

Example 4 was repeated except that following the addition of the glyoxime distearate to the Brabender plastograph, 49 mg. ferric acetylacetonate was added to the plastograph and milling was continued for 5 minutes. The compounded polymer was removed from the plastograph and pressed into a 20 mil thick plaque on a platen press at 150° C. and 40,000 p.s.i. for 5 minutes. On characterization the thus cured polymer showed slight discoloration and had a gel content of 47%. A comparison of Example 4 with Example 5 shows the advantage of using an accelerator whereby the crosslinking temperature can be lowered and in addition the crosslinking efficiency is increased.

Example 5 was repeated except that 0.019 mole of glyoxime per 100 g. of EPR and 0.013 g. ferric acetylacetonate/100 g. EPR was compounded and the curing temperature was 200° C. On characterization the thus cured polymer showed only slight discoloration and had a gel content of 60%.

EXAMPLE 6

37.5 g. of ethylene-propylene rubber were milled for 5 minutes in air at 110° C. at 30 r.p.m. in a Brabender plastograph. 0.012 mole of furil dioxime distearate/100 g. EPR was added to the mill and milling was continued for an additional 5 minutes. The milled charge was removed and pressed in a platen press wherein it was cured under 40,000 p.s.i. at 225° C. for 5 minutes. On characterization the thus crosslinked polymer showed only slight discouoration and had a gel content of 50%.

EXAMPLE 7

Example 6 was repeated except that 0.012 mole of glyoxime dibenzoate/100 g. EPR were substituted for the furil dioxime distearate. On characterization the thus cured polymer showed only slight discoloration and had a gel content of 38%.

EXAMPLE 8

Example 6 was repeated except that 0.012 mole of dimethylglyoxime dibenzoate/100 g. EPR was substituted for the furil dioxime distearate. On characterization, the thus crosslinked polymer showed only slight discoloration and had a gel content of 13%.

EXAMPLE 9

Example 6 was repeated except that 0.012 mole of quinone dioxime dibenzenesulfonate/100 g. EPR was substituted for the furil dioxime distearate and the curing temperature was 175° C. On characterization, the thus crosslinked polymer had a gel content of 50%.

EXAMPLE 10

Example 6 was repeated except that 0.012 mole of terephthalaldehyde dioxime distearate/100 g. EPR was substituted for the furil dioxime distearate and the curing temperature was 250° C. On characterization the thus crosslinked polymers showed only slight discoloration and had a gel content of 30%.

Repeating this example with the addition of 49 milligrams ferric acetylacetonate to the Brabender charge increased the gel content to 44% on curing at 250° C.

The following examples show the operability of the cross-linking agents of the instant invention with various other polymers.

EXAMPLE 11

37.5 g. of butyl rubber comprising 98% isobutylene and 2% butadiene were milled for 5 minutes in air at 110° C. at 30 r.p.m. in a Brabender plastograph. 0.012 mole of glyoxime distearate/100 g. butyl rubber was added to the plastograph and milling was continued for an additional 5 minutes. The milled charge was removed and pressed into a 20 mil thick plaque in a platen press wherein it was cured at 40,000 p.s.i. and 175° C. for 5 minutes. On characterization the thus crosslinked rubber showed slightly discoloration and had a gel content of 66%.

EXAMPLE 12

37.5 g. of commercially available polyethylene having a density of 0.96 and a melt index of 0.7 were milled for 10 minutes at 160° C. and 30 r.p.m. in air in a Brabender plastograph. 0.009 mole of dimethyl glyoxime distearate/100 g. of polyethylene was added to the plastograph and milling was continued for an additional 10 minutes. The milled charge was removed and pressed in a platen press wherein it was cured under 40,000 p.s.i. at 225° C. for 5 minutes. On characterization the thus crosslinked polymer showed only slight discoloration and had a gel content of 40%.

EXAMPLE 13

Example 12 was repeated except that the polymer was a commercially available polyethylene which had been subjected to oxidation until it had a carbonyl content of 0.3%. Samples of the polymer in 20 mil thick plaque form were cured at 40,000 p.s.i. in a platen press for 5 minutes at temperatures of 175° C., 200° C. and 225° C. On characterization the cured samples resulted in percent gel contents of 18, 29 and 50% respectively with the increasing curing temperatures. The samples showed only slight discoloration on curing.

The following examples in Table II show the effect of using an accelerator on the gel content obtained at various concentrations. In all examples 40 parts by weight of an ethylene acrylic acid copolymer having a melt index of 0.5, RSV of 0.69, a carboxyl content of 0.91 meq./g. and a density of 0.93 were admixed with 1.872 parts of dimethyl glyoxime dibenzoate along with varying amounts of ferric acetylacetonate in a Brabender plastograph for 5 minutes in air at 110° C. The compounded material was removed from the Brabender plastograph and pressed into a 10 mil thick sheet on a platen press at 40,000 p.s.i. and 110° C. for 2 minutes. The pressed sheet was then cut into strips 1" x 1" and said strips were placed between two weirchrome adherends 3" x 1" x 6" mil thickness and pressed in a platen press under 40,000 p.s.i. gauge pressure at 200° C. for 1 minute to give an adhesive surface 1" x 1' x 3 mil thick. The adhering weirchrome substrates were cooled at room temperature for 24 hours and then subjected to a T peel test in accord with the procedure of ASTM D 1876–61T. The peel strength test was run on a Scot Tensile Tester with a pull rate of 1" per minute to measure adhesion in lbs./linear inch (p.l.i.). he percent gel content of the samples were also measured. The results are shown in Table II.

The use of ferric acetylacetonate as an accelerator increases the gel content under the same bonding conditions. The main benefits of accelerators are to (1) shorten the bonding cycles at a given temperature, (2) lower the operable bonding temperature if bonding time is held constant and (3) improving the heat resistance of the adhesive bond.

What is claimed is:

1. A curable composition consisting essentially of 100 parts by weight of polymeric material containing at least 50 mole percent of a monomer derived from an α-olefin, said polymeric material being selected from the group consisting of polyethylene, polypropylene, ethylene-butylene copolymer, butyl rubber, chlorosulfonated polyethylene, oxidized polyethylene, ethylene-propylene copolymer, ethylene-vinyl acetate copolymer, ethylene-propylene-diene terpolymer and mixtures and blends thereof, 0.1 to 30 parts per 100 parts of said polymeric material by weight of a curing agent consisting of diesters of dioximes wherein the oxime nitrogen atoms are connected by a chain of conjugated unsaturated carbon atoms of the formula:

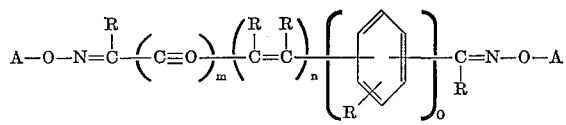

wherein A is acyl, aroyl, alkyl sulfonyl, aryl sulfonyl, alkyl phosphinyl, aryl phosphinyl, alkyl sulfinyl, aryl sulfinyl, alkyl carbamyl and aryl carbamyl, said aryl and alkyl group containing 1–36 carbon atoms, R is H, alkyl, aryl, alkaryl, aralkyl, halogen, nitro, and

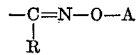

wherein R is as herein defined and m, n and o are integers from 0 to 2.

2. The composition of claim 1 wherein the crosslinking agent is glyoxime distearate.

3. The composition of claim 1 wherein the crosslinking agent is dimethylglyoxime distearate.

4. The composition of claim 1 wherein the crosslinking agent is glyoxime dibenzoate.

5. The composition of claim 1 wherein the crosslinking agent is furil dioxime distearate.

6. The composition of claim 1 wherein the crosslinking agent is terephthalaledhyde dioxime distearate.

7. The composition of claim 1 which contains in addition 0.05–200 parts of a filler per 100 parts polymeric material.

8. The method of curing polymeric material containing at least 50 mole percent of a monomer derived from an α-olefin, said polymeric material being selected from the group consisting of polyethylene, polypropylene, chlorosulfonated polyethylene, oxidized polyethylene, ethylene-butylene copolymer, butyl rubber, ethylene-propylene copolymer, ethylene-vinyl acetate copolymer, ethylene-propylene-diene terpolymer and mixtures and blends thereof which comprises mixing together 100 parts by weight of said polymeric material, 0.1 to 30 parts/100 parts of said polymeric material by weight of a curing agent consisting of diesters of dioximes wherein the oxime nitrogen atoms are connected by a chain of conjugated unsaturated carbon atoms of the formula

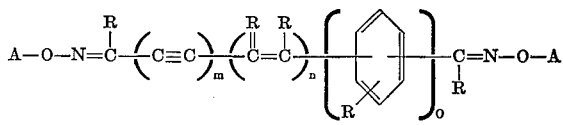

wherein A is acyl, aroyl, alkyl sulfonyl, aryl sulfonyl, alkyl phosphinyl, aryl phosphinyl, alkyl sulfinyl, aryl sulfinyl, alkyl carbamyl and aryl carbamyl, said aryl and alkyl groups containing 1–36 carbon atoms, R is H, alkyl aryl, alkaryl, aralkyl, halogen, nitro, and

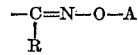

wherein R is as herein defined and m, n and o are integers from 0 to 2 and heating the resultant mixture to effect curing of said polymeric material.

9. The method according to claim 8 wherein the crosslinking agent is glyoxime distearate.

10. The method according to claim 8 wherein the crosslinking agent is dimethylglyoxime distearate.

TABLE II

| | Curable Composition | Ferric acetonate Accelerator, weight Percent | Bonding Conditions | | Peel Strength PLI | Percent Gel Content |
|---|---|---|---|---|---|---|
| | | | Time, mins. | Temp., ° C. | | |
| Example No.: | | | | | | |
| 14 | A [1] | 0 | 1 | 200 | 58 | Nil |
| 15 | A [1] | .25 | 1 | 200 | 44 | Nil |
| 16 | A [1] | .50 | 1 | 200 | 35 | 42 |
| 17 | A [1] | .75 | 1 | 200 | 37 | 63 |

[1] 40 parts ethylene-acrylic acid copolymer, 0.5 MI, 0.69 RSV and 0.93 density, commercially available from Dow Chemical Co. under tradename QX 3623.15 and 1.872 parts dimethyl glyoxime dibenzoate.

11. The method according to claim 8 wherein the crosslinking agent is glyoxime dibenzoate.

12. The method according to claim 8 wherein the crosslinking agent is furil dioxime distearate.

13. The method according to claim 8 wherein the crosslinking agent is terephthalaldehyde dioxime distearate.

14. The method according to claim 8 wherein in addition 0.05–200 parts of a filler per 100 parts polymeric material is admixed with the polymeric material.

15. The composition of claim 1 containing in addition 0.005 to 2.0 parts by weight of an accelerator per 100 parts of polymeric material.

16. The composition according to claim 15 where the accelerator is selected from the group consisting of $AlCl_3$, $FeCl_3$, $SnCl_4$, $ZnCl_2$, ferric acetylacetonate, aluminum acetylacetonate and zinc acetylacetonate.

17. The method according to claim 8 wherein 0.005–2.0 parts by weight of accelerator per 100 parts of said polymeric material is added to the mixture prior to the heating step.

18. The method according to claim 17 wherein the accelerator is a member of the group consisting of $AlCl_3$, $FeCl_3$, $SnCl_4$, $ZnCl_2$, ferric acetylacetonate, aluminum acetylacetonate and zinc acetylacetonate.

References Cited

UNITED STATES PATENTS

| | | | |
|---|---|---|---|
| 2,888,464 | 5/1959 | Shapiro | 260—340.5 |
| 2,980,708 | 4/1961 | Payne | 260—348 |
| 3,305,517 | 2/1967 | Kehr | 260—41 |

JOSEPH L. SCHOFER, Primary Examiner

R. S. BENJAMIN, Assistant Examiner

U.S. Cl. X.R.

260—82.1, 86.7, 88.2, 93.7, 94.9, 878, 879, 885, 566, 85.3

PO-1050
(5/69)

UNITED STATES PATENT OFFICE
CERTIFICATE OF CORRECTION

Patent No. 3,478,004                   Dated November 11, 1969

Inventor(s)   Clifton L. Kehr and James L. Guthrie

It is certified that error appears in the above-identified patent and that said Letters Patent are hereby corrected as shown below:

In Column 1, line 55 the formula:

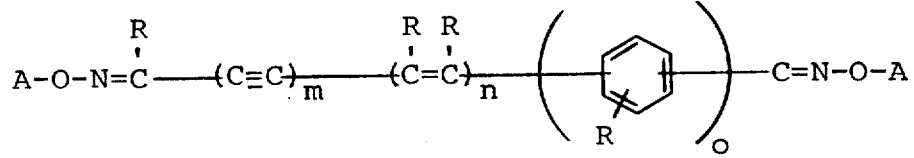

should read:

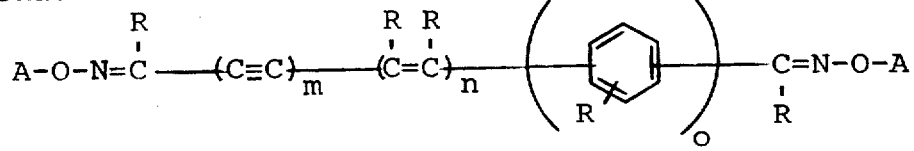

In Column 7, Claim 1, line 68 of the patent, the formula:

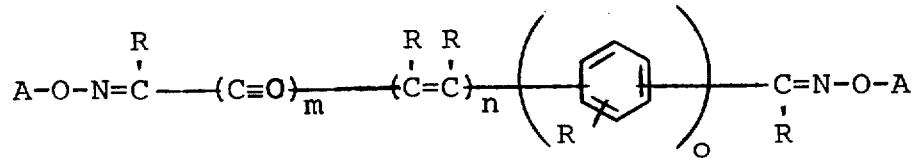

should read:

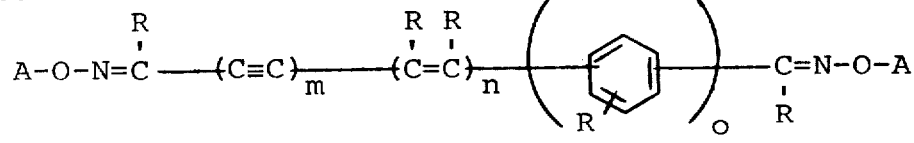

In Column 8, Claim 8, line 57 the formula:

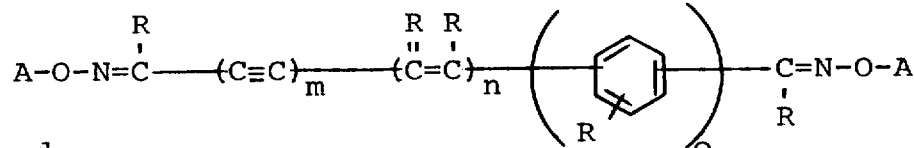

should read:

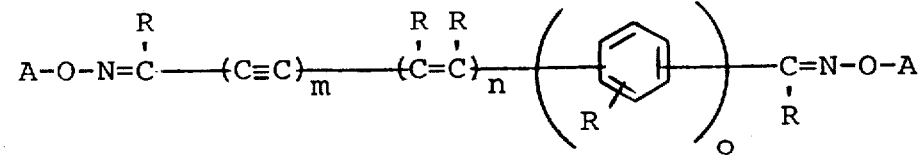

SIGNED AND
SEALED

MAY 26 1970

(SEAL)
Attest:

Edward M. Fletcher, Jr.

Attesting Officer

WILLIAM E. SCHUYLER, JR.
Commissioner of Patents